April 4, 1944. E. H. GODFREY 2,346,021
INTERNAL COMBUSTION ENGINE
Filed Nov. 8, 1938 2 Sheets-Sheet 2
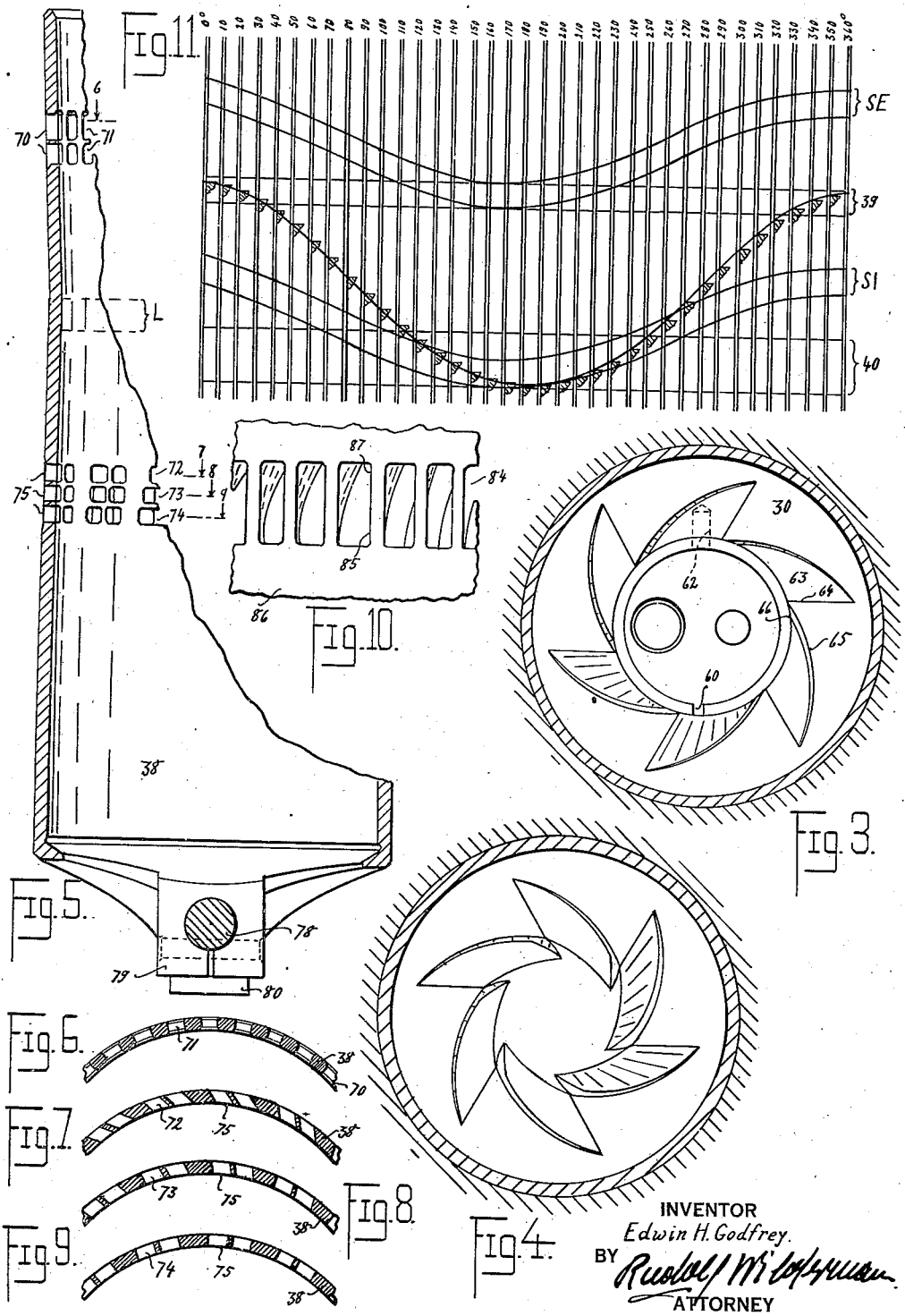
INVENTOR
Edwin H. Godfrey.
BY
ATTORNEY Patented Apr. 4, 1944

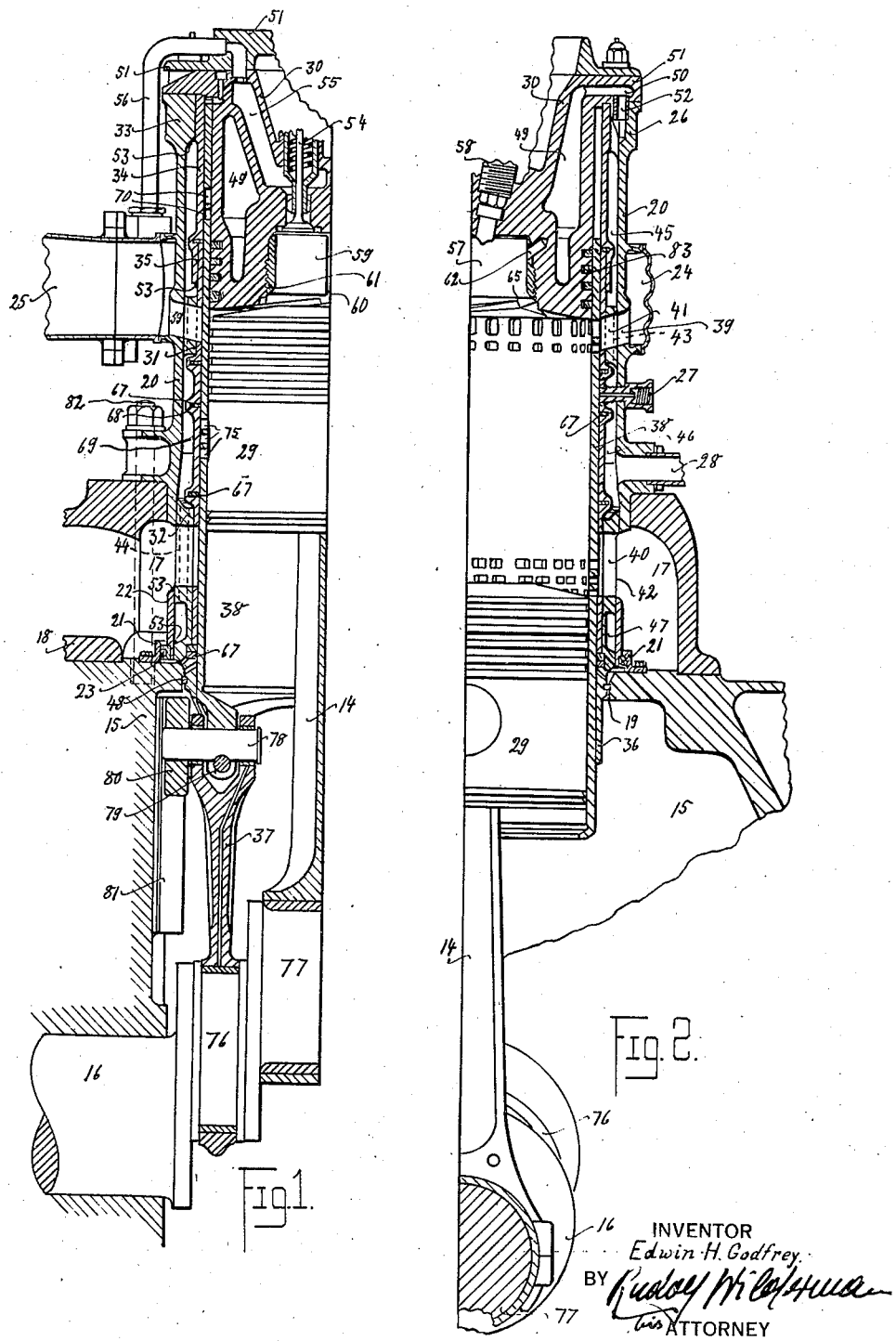

2,346,021

UNITED STATES PATENT OFFICE 2,346,021

INTERNAL COMBUSTION ENGINE

Edwin H. Godfrey, Wenonah, N. J., assignor to Atlantic Diesel Corporation, a corporation of New Jersey Application November 8, 1938, Serial No. 239,429

8 Claims. (Cl. 123—75)

This invention relates to an internal combustion engine of a type, in which the ratio of power output to the volumetric capacity and to the weight of the engine is very high. Engines, in which such characteristics are emphasized, find use in the field of transportation and more particularly of aviation.

It is the general object of this invention to increase upon the efficiency of such engines, and more particularly to improve upon a cyclical turnover of a combustible mixture therein, to effect clean and complete combustion of such mixture, and to convert the energy thus created in an efficient manner into mechanical power.

The improvements of the instant invention have been developed and are herein described in connection with a supercharged, solid injection, two-stroke cycle, sleeve valve type engine, and are primarily claimed in connection with that type of a prime mover. But many of the features of this invention are not strictly limited to such engines, but may as well apply to any supercharged, or a supercharged solid injection, or a two-stroke cycle, or a sleeve valve type of an engine, or an engine bearing any two or more of these characteristics.

Some of the problems which are contemplated and overcome in the instant invention are old in connection with one or the other of the type specified above. But the solutions previously suggested and tried for these problems were intricate and complicated and introduced new difficulties, so that, taking a practical point of view, the prior art preferred to allow the old disadvantages to continue. But the problems are compounded and become serious, when the capacity of the cylinder is taxed according to the purview of the instant invention, and a multiplicity of cylinders must be accommodated within a relatively limited space. The problems for which this invention is to provide a remedy, are as follows:

When an engine is pushed to an extremely high specific output, the differences of heat in various portions of a part or between adjacent parts, and also pressures are increased and affect the cylinder walls, the piston top, the cylinder head, more particularly a cylinder head of the reentrant type used when there is a sleeve valve, and a sleeve valve. Local heating of the cylinder walls can of course not be avoided; but undesirable effects thereof are overcome by rendering the cylinder wall substantially independent of other parts of the housing, eliminating it as a structural member of the housing, and by avoiding reactions upon the housing which would be influenced by expansion of the cylinder wall. I find it desirable to provide in the cylinder wall a packing for lubricant control, say oil scraper rings. In arranging the cylinder wall for such lubricant control, I have succeeded at the same time in shaping the cylinder wall in such fashion, that the strains caused by heat are released, e. g., by providing bellow flutes in a suspended cylinder wall, which also accommodate the lubricant packing. An improved turbulence is provided by shaping the cylinder head or the top of the piston, or both, for regulated flow, i. e., circulation of gases thereover. Protection against direct heat is provided in the cylinder head by an insert, which at the same time serves other functions hereinafter to be explained.

Undesirable consequences of the effect of heat upon a sleeve valve are overcome by shaping the valve, so that it functions properly when distorted by heat.

Several objects of this invention, more particularly in connection with a two-stroke cycle operation, concern the control and conditioning of gases introduced in and removed from the cylinder. Applicant is aware, that the prior art has arranged the intake ports radially or has arranged them angularly or tangentially. The former arrangement had a tendency to cause the charge introduced to arise as a column substantially centrally in the cylinder within the burnt gases, some of the burnt gases remaining substantially introduced in the cylinder. An angular or tangential arrangement of the intake ports or ports was therefore adapted in order to produce greater turbulence; but the scavenging suffered, when the angle at which the charge is introduced is of an order producing great turbulence. The cold, incoming charge hugs the bore of the cylinder under the centrifugal force produced by taking it in at a tangential incline so that the desired swirl is produced. Thus the inflowing, whirling charge leaves a most undesirable central core of unburnt gases. These disadvantages of the prior art are successfully overcome herein by introducing the gases at one angle at one level and at another angle at another level of the cylinder.

A whirling of the charge of the cylinder may further be improved upon in the instant invention, particularly in connection with a combustion chamber receded into the cylinder head, by shaping the bottom surface of the cylinder head, or the top of the piston or both for the purpose of predeterminedly directing the charge compressed between the said two surfaces.

In order further to enhance the mixing of gases in the cylinder, and in order to improved upon the dispersion of the injected fuel, applicant provides, in accordance with this invention, a hot point in the cylinder head, which preferably assumes the shape of the insert mentioned hereintofore. The invention also deals with the mounting of such an insert in such a manner, that it affords the desired protection, and also expedites the volatilization of the injected fuel.

Applicant is aware that for a large turn-over of gases in an engine of the type discussed, for the proper mixing of the charge, and for a complete scavenging of the burned gases, a carefully selected port cycle must be used. On the other hand the prior art could not avail itself of the best adapted cycle, unless an intricate valve mechanism was used, which has encumbered the engine by cam shafts, gearing, levers and the like. According to an object of this invention, all these auxiliary elements are to be eliminated, and to be replaced by a direct crank control of the valve from the main shaft of an engine.

Other objects of this invention will be better understood from a description of a particular embodiment of the invention. Such description and embodiment are rendered and shown for purposes of illustration only and are not to be interpreted in limitation of the invention.

In the drawings—

Fig. 1 shows the bisected cylinder of an engine, in which the piston is substantially in a top position, in a longitudinal cross-section taken substantially through the axis of the main shaft.

Fig. 2 shows another half of the cylinder of an engine, with a piston in substantially the lowest position, the cross-section being taken normal to the main shaft substantially along the centerline of the cylinder.

Fig. 3 is a view looking up into a cylinder, the section being taken near the level of the bottom surface of the reentrant head.

Fig. 4 is the top view of a piston, and serves to illustrate how a piston surface may be shaped in analogy to the arrangement which is provided on the bottom of a cylinder head in accordance with Fig. 3.

Fig. 5 is a cross-sectioned detail view of a sleeve valve. In order to visualize the manner in which the valve may be shaped in accordance with this invention, the tapers applied to the sleeve valve have been greatly exaggerated.

Figs. 6, 7, 8 and 9, are cross-sections of a sleeve valve of Fig. 5, taken in the directions and at the levels pointed out in Fig. 5 by arrows and the numerals of the respective figures.

Fig. 10 is an elevational view of a detail of a modified sleeve valve, taken at the level of the intake passages.

Fig. 11 is a diagram relating progressively from left to right, to successive angular crank shaft positions, indicating the respective positions of the cylinder and valve ports, and a top corner of the piston indicating the top level thereof.

Similar numerals refer to similar parts throughout the various views.

In Figs. 1 and 2 the crank shaft 16 is journalled in a crank case 15 and operates piston 29 by way of connection rod 14. A circular opening 19 for the cylinder is arranged in the top of the crank casing 15. Opening 19 is concentrically surrounded by the flange 21, which is mounted on the crank casing. Above said flange extends the larger charging manifold 17, which is also concentrically mounted upon the crank casing, and which has an intake 18 connecting it to a supercharger or carburetor. Concentrically again to the opening 19, the flange 21 and the manifold 17 just mentioned, the cylinder jacket 20 is superimposed and mounted on manifold 17. By way of bolts 82—arising from the crank case and extending through the wall of the manifold 17 for instance—the jacket is firmly secured upon the crank case, and extends straight up as the principal structure cylinder member. The jacket closes, by way of a downward extension 22 and by way of packing 23, upon the angular flange 21. The upper end 26 of jacket 20 is widened in order to offer support for the reentrant cylinder head 30. Therebelow the jacket comprises and is surrounded by an exhaust manifold 24, from which extends the exhaust pipe 25.

Outwardly the jacket may also carry connectors for lubricating means, like 27, connecting through the jacket through the cylinder wall, and there may be suitable connections for a cooling fluid, like intake 28.

Inwardly the jacket may carry protruding rims 33 or annuli 31 and 32, which intimately unite, e. g. by way of fused or welded joints 53, the cylinder jacket 20 with the cylinder proper 34. The cylinder proper 34 may be assembled from sections as indicated at 35, the annuli, cylinder and jacket or their sealedly united parts forming a fluid-tight assembly. As a matter of fact the lower-most end of the lower annulus 32 is shown to be converted for use as the bottom section of the cylinder proper, e. g., at 36, said bottom part being shorter on one side in order to clear the connecting rod 37 connecting the sleeve valve 38 in crank fashion to the crank shaft 16.

By way of the annuli 31 and 32 the jacket together with the cylinder proper 34 represent heavy cross-sections at the port levels. These sections are freely perforated by way of port holes 39 and 40, all around the cylinder, and leaving narrow webs between such opening, such as 41 and 42, respectively. The webs in turn may be vertically perforated, e. g., by holes 43 and 44, respectively, in order to provide intercommunication between the top portion 45, center portion 46 and bottom portion 47 of the outer cooling chamber provided between the jacket 20 and the cylinder proper 34. The cylinder 34, being engaged upon the widened top end of the jacket 20, depends all the way down and the bottom section 36 is inserted through the opening 19 in crank case 15, closing upon said opening at 48 where oil drains from the bottom contracting scraper ring.

An inner cooling chamber 49 extends around the reentrant cylinder head 30, and has also a lobe or lobes 50 extending into the top flange 51 of the head 30. A bushing 52 connects said lobe 50 in flange 51 through the widened portion 26 of jacket 20, and forms a conduit for intercommunication of the cooling fluid, between the outer cooling chamber around the cylinder and the cooling chamber 49 in the cylinder head 30.

In the engine here shown a tube 56 connects the exhaust manifold by way of the flange 51 of cylinder head 30 and by way of channel 55 in cylinder head 30 to a decompression valve 54 in the cylinder head, such a decompression valve being controlled for and finding use in starting the engine, as known in the prior art. At another point, spaced from valve 54, a fuel injector nozzle 58 extends through the cylinder head into the recess or combustion chamber 57 of the head 30, said nozzle 58 being connected in the customary way to a fuel supply, by way of a pump for instance. If the insert which was referred to above and which serves as a lining for the combustion chamber or recess 57, extends over the bottom of said recess, said insert should have suitable clearances for parts connecting to the outside, like said valve 54 or nozzle 58. But in the drawings the insert is not shown as a cap, but merely as a sleeve 59.

Sleeve 59 is shown to be inserted by way of a coarse thread 61 in the recess or combustion chamber 57, the sleeve being secured in the recess against rotation by way of a pin 62 extending through the sleeve into the cylinder head 30. Pin 62 may be secured by welding, or it should be cut off slightly under the inner surface of the corrosion resistant sleeve or insert 59, and the insert is then peened over, so that both, the pin and insert, are locked into place. The insert or sleeve 59 is preferably made of a corrosion resistant metal, such as stainless steel and may therefore have a thermal expansion coefficient different from that of the material of the cylinder head 30, and it will also be heated to a higher temperature, than the cylinder head 30 because it is directly exposed to the combustive explosion, but only indirectly connected to the cooling chamber 49 of the cylinder head 30. When expanding under heat, sleeve 59 is prevented from causing undue tension in the cylinder head 30 because the sleeve is interrupted, a slot 60 being indicated on one side of the sleeve for such purpose. While a sleeve thus mounted in a cylinder head will readily heat up more than the other parts of the engine, heat conduction from the sleeve to the cylinder head is not good because of poor contact with the cylinder head, so that the insert or sleeve is an excellent medium for evaporating the fuel thrown against it by the whirling charge, effecting markedly improved combusion. Proof that the thermal conductive contact between the sleeve or insert 59 and the cylinder head 30 becomes very poor after a short period of operation of the engine, is visually rendered by the fact that the slot 60 is very soon reduced to a thin line. While this method of mounting provides what might be called a thermal conductive insulation between the sleeve and the cylinder head, the sleeve remains properly secured in the recess 57, it causes no strain whatever, and there is no danger that it become loose and might cause damage.

In order to impart a whirl to the charge pressed from between said piston and the confronting end of the cylinder head into the recess or combustion chamber 57, the surface of the cylinder head which comes into close proximity with the piston, or the top of the piston may be given a suitable form, or a plate may be superimposed upon the cylinder head or upon the piston and may be suitably formed in order to direct the charge in a preferred way. These formations may of course be arranged in such manner, that the protruding parts in the piston match receded parts in the cylinder head, or the converse. But ordinarily the shaping of one of the parts is sufficient; and in the views of Figs 1, 2 and 3 the formation is shown on the cylinder head, whereas Fig. 4 shows a similar arrangement applied to the top of the piston.

Into the face of the cylinder head 30 of Fig. 3 a plurality of grooves 63 slope down towards the center and also sideways, e. g., from edges 64, these grooves being slightly offset, spirally for instance, from a radius in the direction in which the whirl is to be produced, i. e., a counter-clockwise direction in this case, e. g., along a delimiting embankment which swerves sinusoidally in the direction in which the whirl is to enter the combustion chamber. Such an embankment may assume the form of a steeply disposed wall formation 65, which increases to a greatest depth at its innermost point 66, where the gas rolling down in slope 63 and along wall 65 is substantially tangentially and whirlingly directed into the recess or combustion chamber 57.

Good tuburlence will be caused by these formations impressed upon the cylinder head or piston top, and they may of course be varied by rearranging the angle, decline, length, depth and number of the grooves. When the spiral grooves are cut into the cylinder head, there is less danger of overheating at the sharp edges confronting the spiral grooves, because the cylinder head is cooled. On the other hand it is not desirable to increase the heat absorbing surface of the piston top, because it is not cooled directly by a circulated liquid. If a whirling motion has already been imposed upon the charge driven up by the piston—arrangements made for this purpose being discussed hereinafter—the grooves 63 should of course be correspondingly slanted, so that they supplementarily direct the charge in the same sense of rotation, as that previously imposed upon it.

It has already been explained herein that the cylinder proper 34 depends into the cylinder jacket 20 from the top rim 33, where the cylinder is suspended in the jacket. Thus the jacket 20 is primarily the supporting element for the reentrant head and the other parts mounted on the cylinder, whereas the cylinder proper is hardly a structural member at all, so that its thermal expansion cannot affect the assembly. But it is of course necessary to interconnect the cylinder proper at various points with the cylinder jacket, where the ports 39 and 40 pass for instance through both of these parts, and it may be desirable to avoid any strain longitudinally of the cylinder proper between the points where it is intimately united with the jacket 20. Such relief of strain can be obtained by accommodating the oil scraper rings 67, which serve for a lubricant control between the cylinder proper and the sleeve valve, in grooves of the cylinder bore, which are of such depth, that the solid extent or continuity of the cylinder wall is vertically interrupted at these points. In other words the recesses 68 accommodating the rings 67 are of a bottom diameter larger than the normal outer diameter 69 of the cylinder proper.

Thus the cylinder will freely expand and contract in axial direction in bellows fashion.

A step 76 on the crank shaft 16 serving for the sleeve valve control may be angularly and eccentrically distinct from the step 77 which serves for the piston control, so that a cyclic stroke of the sleeve valve may be obtained, and such sleeve valve stroke may be offset relatively to the piston stroke, may for instance be advanced in relation thereto, the dead center position of the sleeve valve of the engine being exemplarily illustrated as 10° and 45 minutes ahead of the dead center position of the piston. Crank step 76 of crank shaft 16 is shown to be connected with the sleeve valve by way of a connecting rod 37 on one side of the sleeve valve only, a reciprocating crosshead upon the end of the wrist pin connecting the connecting rod 37 with the sleeve valve 38 serving to prevent the sleeve valve from oscillating or gyrating. A split hub 79, which forms an integral part with the sleeve valve 38 is clamped onto the pin 78, between the forked upper ends of the connecting rod 37. Pin 78 extends beyond the connecting rod 37, and carries at its end a slide 80, which is vertically reciprocatably accommodated in a track 81 in the crank case 15.

One or more split rings 83 are accommodated in the outer, lower periphery of the reentrant head 30, so that they seal upon the upper end of the sleeve valve 38, which extends between the reentrant head 30 and the cylinder core 34.

One or more upper rows 70 of the sleeve valve exhaust port holes 71 serve as a sleeve valve exhaust port SE, as shown in Figs. 2 and 5. The said figures also show three lower rows 72, 73 and 74 of sleeve valve intake holes 75, which serve as a sleeve valve intake port SI. When the sleeve valve exhaust port registers with the exhaust port 39 of the cylinder, as shown in Fig. 2, the sleeve intake port also registers with the intake port 40 of the cylinder, at least along its lower margin, the cylinder intake port extending however much higher than the sleeve valve intake port for purposes hereinafter to be explained, more particularly in connection with Fig. 11.

In order to obtain the improved turbulence and scavenging explained hereinabove, the top row 72 of sleeve valve intake holes 75 may be disposed tangentially, i. e., at a substantial angle with a plane extending to each of the holes from the sleeve valve axis. The holes of the rows 73 and 74 may successively be inclined at a lesser angle, the holes of the last row 74 being for instance disposed at zero angle, i. e., they extend radially through the wall of the sleeve valve.

We may also obtain the object of improved turbulence and scavenging by twisting the holes along their vertical extent for which purpose they may be vertically elongated, opposite side walls of a hole being substantially spirally disposed in parallelism with each other. This embodiment may for instance be arrived at by merging those holes with each other, which are in substantially vertical alignment in the rows 72, 73 and 74. Such an arrangement decreases the friction to be overcome by the inflowing charge; but here care must be taken, that the structural, longitudinal strength of the sleeve valve is not unduly reduced.

This embodiment of a sleeve valve intake port, is illustrated in Fig. 10 where the intake holes 84 of a sleeve valve 86 are substantially radially disposed at their lower ends 85, but turns thereabove, so that they extend tangentially at their upper ends 87.

Whether the change of direction of intake of the charge along a vertical extent is effected in one or the other manner described, the effect will be substantially the same. A charge entering along the upper extent of the sleeve valve intake port will set up a whirl, which may hug the sleeve valve bore. But when the piston also clears the bottom extent of the sleeve valve intake port, the charge there rushing into the sleeve valve will displace the burned gas which had remained at the center of the piston top, will cool the piston top, and will drive said burned gases centrally up in the cylinder, so that the scavenging, i. e., the displacement of the burned gases, proceeds at substantially an equal pace throughout the cylinder cross-section. Of course the radial inflow is cyclically first shut off ahead of the tangential inflow, as the piston rises, so that the last effect of the inrushing charge, i. e., after the scavenging has been substantially completed, is that of producing a whirl, which then causes good mixing of the charge, or of the air charge with the injected fuel, particularly when the above discussed groove formation of the cylinder head or piston top finally accentuates the whirling of the charge as it is pressed into the central combustion chamber 57.

During operation the sleeve valve of an internal combustion engine heats up more at certain of its levels, than at others. In connection with a sleeve valve extending around a reentrant head, the cross-section heated the most will be located somewhere between the ends of the sleeve valve. In an engine of the type here shown the greatest heat will accumulate in the valve between the valve ports substantially at the section exposed when the piston is at top center. Experimentally it has been determined, that the greatest heat arises substantially centrally between the ports, which, in the arrangement here shown, is one-third down from the top or two-thirds up from the bottom of the solid sleeve valve. I have found that the friction between the sleeve valve and the cylinder bore is greatly reduced, if the outside diameter of the sleeve valve is reduced at the level where the greatest heating occurs. This may also be brought about by contracting the sleeve valve, as a whole, or in particular at the said level which has been marked L in the drawings, so that a substantially straight bore is offered to the sliding piston in the sleeve valve—instead of a hollow double cone—when it rides up and down in the heated valve, which then should be a straight cylinder.

Thus the sleeve of Fig. 5 has for instance a short inner cylindrical section L, where maximum heat occurs. From said section L, the sleeve enlarges evenly in both directions, preferably at a light taper, and the outside of the sleeve is correspondingly tapered in opposite directions, so that the sleeve has a substantially uniform thickness throughout. Thus with a sleeve about 15″ long, about 6″ in diameter, and about $5/32″$ thick, the diameter at the upper end of the sleeve was about .003 inch, and at the lower end of the sleeve about .006 inch larger than the diameter at the level L, where the greatest heat occurs.

Taking the top center position of the piston 29 as the starting point, in relation to which a left section of the sleeve valve 38 and a left upper corner of the piston 29 are plotted in Fig. 11 for each 10 degrees of angular movement of the crank shaft. We note that on account of the offset arrangement of the sleeve valve crank in relation to the piston crank, the sleeve valve exhaust SE registers with the cylinder exhaust port 39, at 169° and 15 minutes, at which point the curve indicating the movement of the sleeve valve intake SI tangentially touches the lower extent of the cylinder intake port 40. Since the cylinder intake port 40 is much higher than the other port openings, which are substantially equal in height, the sleeve valve and cylinder intake remain for a much longer period in a fully overlapping relationship, than the exhaust ports of the sleeve valve and of the cylinder.

But the descending piston 29 lays free the intake opening only after the sleeve valve intake has descended into full registration with the cylinder intake, to wit at the position of 125° and 30 minutes, so that the burned gases are free to leave by way of the exhaust ports of the sleeve valve and of the cylinder, long before a charge is taken in. But—later—when the ports are being closed, the intake remains open for a much longer time than the exhaust, on account of the upwardly extended intake opening 40 and because the ascending piston lags behind the ascending sleeve valve. The exhaust port being already closed, the pressure of the inrushing charge may effectively fill the cylinder, until the intake ports are also closed, when the ascending piston assumes the role of further compressing the charge taken in.

Some of the subject matter disclosed herein is covered by divisional applications filed by the applicant on May 4, 1940, and entitled:

Sleeve valve and actuation thereof, Serial No. 333,289; Internal combustion engine, Serial No. 333,291; and a divisional application Serial No. 458,354, filed by him on September 15, 1942, and entitled Lining for the explosion chamber of an internal combustion engine.

Having thus described an example of an engine of this invention, and its operation, yet I do not wish to be limited thereby, except as the state of the art and the appended claims may require, for it is obvious that various modifications and changes may be made in the form of embodiment of my invention, without departing from the spirit and scope thereof.

What I claim is:

1. An engine comprising a cylinder, scraper rings, a piston in said cylinder, a sleeve valve surrounding the piston in the cylinder and circumferentially engaged by said rings, a crank shaft operatively connected to said piston and said sleeve, a cooling jacket surrounding and supporting said cylinder near opposite ends, said cylinder being interiorly spacedly grooved in order to accommodate said rings and in order to permit bellows-like play between its supported ends.

2. An engine comprising a crank case, a cylinder, scraper rings, a piston in said cylinder, a sleeve valve surrounding the piston in the cylinder, a crank shaft in said crank case operatively connected to said piston and said sleeve valve, a cooling jacket secured to said crank case and supporting said cylinder at its upper end, said cylinder depending through said jacket towards the crank case and having upon its inside spaced grooves accommodating said rings, said grooves extending away from the bore of said cylinder beyond the outside diameter which said cylinder has at levels between said grooves.

3. In an internal combustion engine, a crankshaft, a crankcasing surrounding said crankshaft, a jacket for cooling and supporting a cylinder mounted upon said crankcasing and extending radially outward therefrom, a cylinder having ports and closed at one end, mounted at said end upon said jacket, and extending axially towards said crankshaft through said jacket, said cylinder being unsupported at its other end and being grooved at intervals upon its inside, rings loosely filling the grooves of said cylinder, and sealing means circumferentially closing said cylinder upon said jacket around said ports and at the unsupported end thereof, the grooves in said cylinder permitting play in bellows' fashion of said cylinder between said ports.

4. In an internal combustion engine, a crankshaft, a crankcasing surrounding said crankshaft, a jacket for cooling and supporting a cylinder mounted upon said crankcasing and extending radially outward therefrom, a cylinder having a port and closed at one end, secured at said end upon said jacket, and extending axially towards said crankshaft through said jacket, said cylinder being unsupported at its other end, and sealing means permanently securing said cylinder upon said jacket around said port, said cylinder being circumferentially slotted at a portion between levels where it is secured upon said jacket so that it is compressible at such portion in a direction radial to said crankshaft, when the material of such portion expands under heat.

5. An enclosure for the combustion chamber of a reciprocating internal combustion engine comprising a crankcasing, an intake manifold mounted upon said crankcasing, a jacket mounted upon said manifold, and a cylinder mounted upon said jacket and extending guidedly sealedly, but endwise unsupportedly through said jacket and manifold towards said crankcasing.

6. An enclosure for the combustion chamber of a reciprocating internal combustion engine comprising a crankcasing, an intake manifold mounted upon said crankcasing, a jacket mounted upon said manifold, and a cylinder mounted upon said jacket and extending guidedly but endwise unsupportedly through said jacket and manifold towards said crankcasing, said manifold having a portion forming a continuation of said cylinder and extending into said crankcasing.

7. An enclosure for the combustion chamber of a reciprocating internal combustion engine comprising an outer jacket and a cylinder having a cylindrical inner surface, a section of said jacket closing upon the opposite ends of a section of said cylinder and delimiting a substantially annular cooling chamber, rims circularly projecting from the periphery of said cylinder into said cooling chamber, and grooves extending from said cylindrical inner surface into said rims beyond said periphery of said cylinder, so that said section of the cylinder may compress in bellows' fashion when the material of said cylinder expands under heat more than the surrounding section of the jacket.

8. An enclosure for the combustion chamber of a reciprocating internal combustion engine comprising an outer jacket and a cylinder having a cylindrical inner surface, rings in said jacket closing upon the opposite ends of a section of said cylinder and delimiting a substantially annular cooling chamber, rims circularly projecting from the periphery of said cylinder into said cooling chamber, and grooves extending from said cylindrical inner surface into said rims beyond said periphery of said cylinder, so that said section of the cylinder may compress in bellows' fashion when the material of said cylinder expands under heat more than the surrounding section of the jacket.

EDWIN H. GODFREY.